(12) United States Patent
Li et al.

(10) Patent No.: US 8,467,472 B2
(45) Date of Patent: Jun. 18, 2013

(54) DEVICE, SYSTEM, AND METHOD OF ADJUSTING CHANNEL UTILIZATION FOR WIRELESS TRANSMISSION

(75) Inventors: Qinghua Li, San Ramon, CA (US); Feng Xue, Thousand Oaks, CA (US); Wendy C. Wong, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 12/886,648

(22) Filed: Sep. 21, 2010

(65) Prior Publication Data

US 2012/0071192 A1    Mar. 22, 2012

(51) Int. Cl.
*H04L 12/413* (2006.01)
(52) U.S. Cl.
USPC .......................................... 375/295; 370/448
(58) Field of Classification Search
USPC .................. 375/299, 295, 212; 370/445, 447, 370/448
See application file for complete search history.

(56) References Cited

U.S. PATENT DOCUMENTS

2005/0105492 A1* 5/2005 Simonsson et al. ........... 370/332
2008/0273478 A1* 11/2008 Budde et al. .................. 370/311

FOREIGN PATENT DOCUMENTS

| KR | 1020090106597 A | 10/2009 |
|---|---|---|
| KR | 1020100066310 A | 6/2010 |
| WO | 2010/033000 A2 | 3/2010 |

OTHER PUBLICATIONS

International Search Report and Written Opinion Received for PCT Patent Application No. PCT/US2011/052664, Mailed on Feb. 9, 2012, 8 pages.
IEEE Standard for Information technology—Telecommunications and information exchange between systems—Local and metropolitan area networks—Specific requirements Part 11: Wireless LAN Medium Access Control (MAC) and Physical Layer (PHY) Specifications; IEEE Std 802.11™-2007 (Revision of IEEE Std 802.11-1999 ).
International Preliminary Report on Patentability Received for PCT Patent Application No. PCT/US2011/052664, mailed on Apr. 4, 2013. 5 pages.

* cited by examiner

*Primary Examiner* — Kevin Kim
(74) *Attorney, Agent, or Firm* — Shichrur & Co.

(57) ABSTRACT

Device, system, and method of adjusting channel utilization for wireless transmission. For example, a wireless communication unit may control a wireless transmission by a wireless communication device during a contention period, wherein the wireless communication unit is to wait for a back-off period prior to beginning the wireless transmission during the contention period, and wherein a duration of the back-off period is based on a transmission power of the wireless transmission. Other embodiments are described and claimed.

20 Claims, 3 Drawing Sheets

DEVICE, SYSTEM, AND METHOD OF ADJUSTING CHANNEL UTILIZATION FOR WIRELESS TRANSMISSION

BACKGROUND

In a wireless communication system or network, devices may transmit over a wireless channel only after sensing that the channel is not in use ("clear" or "idle"). However, if the devices try to transmit immediately after sensing that the channel is not currently in use, all the devices that were waiting for a clear channel may try to transmit at the same time immediately after the channel ceases to be busy. The resulting "collision" between the signals can prevent one or more of the devices from making a successful transmission.

To reduce the chance of such collisions, some wireless communication standards implement a contention-based mechanism, in which a "Contention Window" (CW) scheme includes a contention period, during which devices that want to transmit will wait, after sensing an open channel, before actually performing a transmission. According to this contention-based mechanism, each device may choose a time period ("the back-off period"), e.g., randomly, and wait until the channel has been idle for this time period before trying to transmit ("first transmission attempt"). The CW defines the maximum period that the device should wait, e.g., the random values are chosen to be within the CW. If the resulting first transmission attempt is unsuccessful, the length of the contention window can be repeatedly increased, e.g., doubled, for subsequent retries, up to some maximum value, until a retry is successful, or until a maximal number of retransmissions is reached. The CW period may be defined by a first value, denoted CWmin, which defines a minimum starting size of the CW, and a second value, denoted CWmax, which defines the maximal size of the CW.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
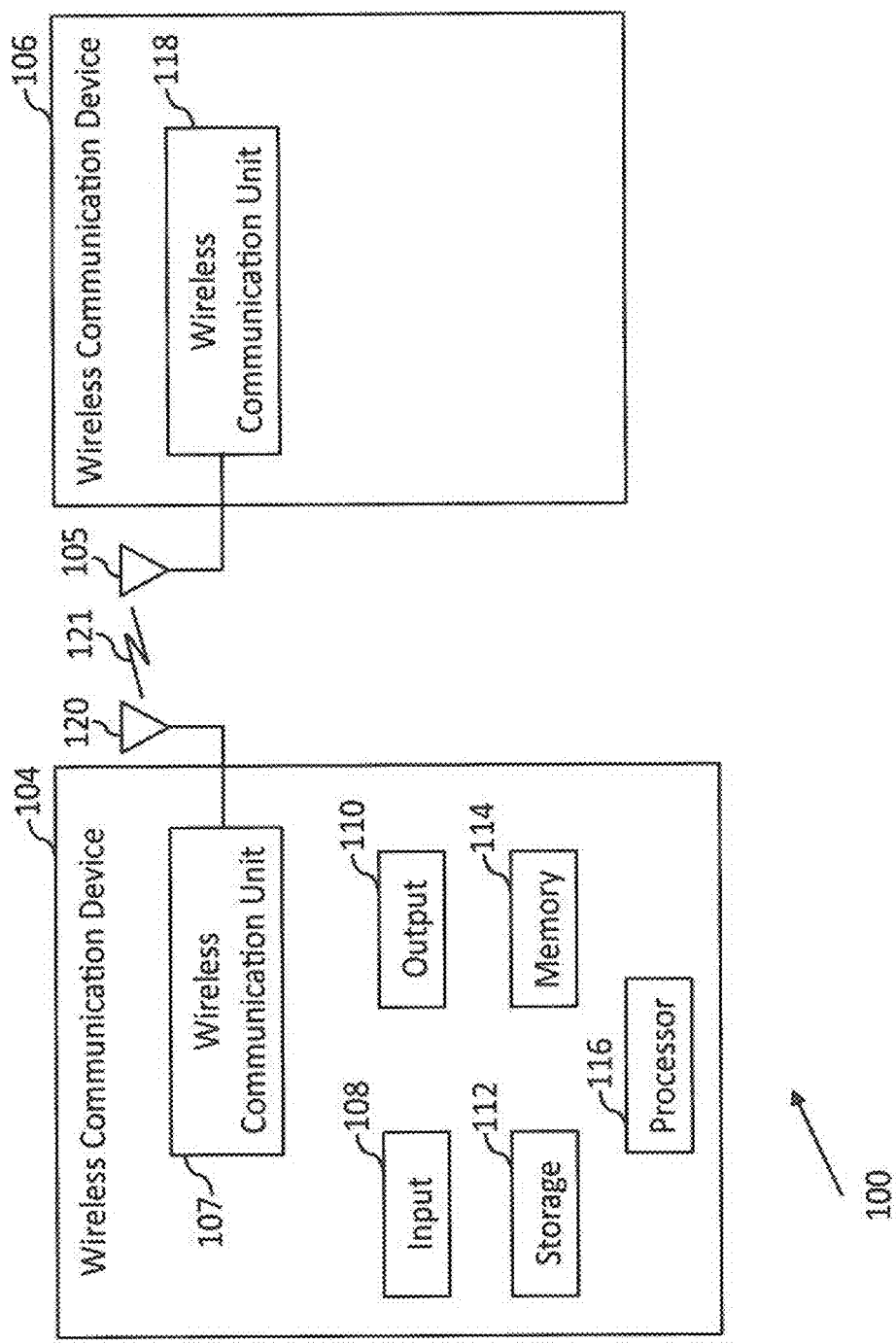
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-1999: *Wireless LAN Medium Access Control (MAC) and Physical Layer (PHY) Specifications*) standards ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

Some demonstrative embodiments may be used in conjunction with suitable limited-range or short-range wireless communication networks, for example, "piconets", e.g., a wireless area network, a WVAN, a WPAN, and the like.

Some embodiments may be implemented for wireless transmission of suitable content between two or more devices. In one embodiment, the content may include media content, for example, audio and/or video content, e.g., High Definition Television (HDTV) content, and the like. In other embodiments, the content may include any other suitable data, information and/or signals.

Some wireless communication system deployments may be relatively dense. For example, some enterprise deployments may set access points only 20-30 meters apart from each other. Interference between wireless transmissions of wireless communication systems, e.g., WiFi systems, may grow, for example, with the growth in the density of the wireless communication systems.

Wireless communication devices (nodes) in distributed networks may use a maximal transmission power for transmitting transmissions, e.g., independently of the transmission distance. A node may prefer to use the maximal transmission power, e.g., allowed under a suitable standard or protocol implemented by the node, in order to maximize its own link performance. If a node uses a reduced transmission power, e.g., while other nodes continue using the maximal transmission power, then the node using the reduced transmission power may suffer a reduced throughput, e.g., due to interference from the other nodes.

The use of excessive transmission power may impose a relatively high interference footprint, unnecessarily preventing high density, parallel transmissions. For example, the utilizing of the maximal transmission power may prohibit utilizing two WiDi links within the same area, e.g., within two neighboring rooms of the same house, since, for example, the interference between the two WiDi links may prohibit the support of a minimal required WiDi transmission rate.

In some demonstrative embodiments, a wireless communication device may controllably use a transmission power, which is lesser than the maximal transmission power, e.g., as described below.

In some demonstrative embodiments, reducing the transmission power of nodes in a wireless communication system may result in reduced interference; may enable using multiple parallel links, e.g., two or more parallel WiDi links; and/or may achieve higher system throughput. The throughput of the wireless links may be increased, e.g., by a factor of five, for example, if the nodes in the wireless communication system lower the transmission power from the maximal power to a minimal required power, e.g., the lowest transmission power supporting a highest modulation and coding set and/or any other requirement.

Reference is now made to FIG. 1, which schematically illustrates a block diagram of a system 100 in accordance with some demonstrative embodiments. System 100 may operate as a wireless area network including a plurality of communication nodes. Each node of system 100 may include any suitable physical and/or logical entity capable of communicating information in system 100, and may be implemented using any suitable hardware and/or software.

In some demonstrative embodiments, one or more nodes of system 100 may be capable of communicating content over one or more suitable wireless communication links, for example, a radio channel, an IR channel, a RF channel, a Wireless Fidelity (WiFi) channel, and the like. One or more nodes of system 100 may optionally be capable of communicating over any suitable wired communication links.

In some demonstrative embodiments, system 100 may be implemented in accordance with the WirelessHD™ specification, the Wireless-Gigabit-Alliance (WGA) specification, and the like. For example, system 100 may perform the functionality of a WVAN, a WPAN, and the like. In other embodiments, system 100 may be implemented in accordance with any other suitable standard, protocol or specification, for example, standards, protocols and/or specifications promoted by the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and the like.

In some demonstrative embodiments, system 100 may communicate, manage and/or process information in accordance with one or more suitable communication protocols. For example, system 100 may implement one or more of a medium access control (MAC) protocol, a Physical Layer Convergence Protocol (PLCP), a Simple Network Management Protocol (SNMP), an Asynchronous Transfer Mode (ATM) protocol, a Frame Relay protocol, a Systems Network Architecture (SNA) protocol, a Transport Control Protocol (TCP), an Internet Protocol (IP), a Hypertext Transfer Protocol (HTTP), a User Datagram Protocol (UDP), and the like.

As shown in FIG. 1, in some embodiments, system 100 may include one or more wireless communication devices ("nodes"), e.g., devices 104 and/or 106.

In some demonstrative embodiments, wireless communication devices 106 and/or 104 may include, for example, a video device, a WiDi device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, an audio amplifier, a data source, a data sink, a DSC, a media player, a Smartphone, a television, a music player, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

In some demonstrative embodiments, wireless device 106 may include a wireless communication unit 118 and/or wireless communication device 104 may include a wireless communication unit 107.

In some demonstrative embodiments, device 104 and/or device 106 may include, for example, one or more of a processor 116, an input unit 108, an output unit 110, a memory unit 114, and a storage unit 112. Coordinator 102, device 104 and/or device 106 may optionally include other suitable hardware components and/or software components. In some embodiments, some or all of the components of each of device 104 and/or device 106 may be enclosed in a common housing or packaging, and may be interconnected or operably associated using one or more wired or wireless links. In other embodiments, components of device 104 and/or device 106 may be distributed among multiple or separate devices or locations.

Processor 116 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 116 executes instructions, for example, of an Operating System (OS) of device 104 and/or device 106; and/or of one or more suitable applications.

Input unit 108 includes, for example, a keyboard, a keypad, a mouse, a touch-pad, a track-ball, a stylus, a microphone, or other suitable pointing device or input device. Output unit 110 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 114 and/or storage unit 112, for example, store data processed by device 104 and/or device 106.

Wireless communication units 118 and/or 107 include, for example, one or more wireless transmitters, receivers and/or transceivers able to send and/or receive wireless communication signals, RF signals, frames, blocks, transmission streams, packets, messages, data items, and/or data. For example, communication units 118 and/or 107 may include or may be implemented as part of a wireless Network Interface Card (NIC), and the like.

Wireless communication units 118 and/or 107 may include, or may be associated with, one or more antennas or one or more sets of antennas 120 and/or 105, respectively. Antennas 120 and/or 105 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, devices 104 and/or 106 may controllably use a transmission power, which is lesser than a maximal transmission power, denoted Pmax, for example, a maximal transmission power according to a standard and/or protocol utilized by system 100, e.g., as described below.

In some demonstrative embodiments, at least one wireless communication device of system 100, e.g., device 104 and/or 106 may be capable setting the transmission power, denoted P, which is utilized by the wireless communication device for performing transmissions, based on one or more parameters of a communication link for transmitting the wireless transmissions.

In some demonstrative embodiments, wireless communication unit 107 may determine one or more parameters of a communication link 121 utilized for transmissions by wireless communication unit 107. The parameters may include, for example, at least one of a data rate, a Modulation-Coding-Scheme (MCS), a quality-of-service (QoS) of communication link 121, a path-loss measurement, a communication link quality, an interference to another device, and/or any other suitable parameter related to link 121 and/or the transmission over link 121.

In some demonstrative embodiments, wireless communication unit 107 may dynamically set the transmission power P for performing the transmissions over link 121 based on the one or more parameters. For example, wireless communication unit 107 may set the transmission power P based on at least one of the data rate over link 121, an average throughput, a MCS of link 121, a QoS of link 121, a path-loss measurement associated with link 121, a communication link quality of link 121, an interference to another device, and/or any other suitable parameter related to link 121 and/or the transmission over link 121.

In some demonstrative embodiments, wireless communication unit 107 may determine the parameters and/or set the transmission power P repeatedly and/or periodically, for example, at a predefined repetition rate, e.g., as described below.

In some demonstrative embodiments, wireless communication unit 107 may monitor the data rate, MCS and/or any other parameter related to link 121, according to any suitable method and/or protocol, e.g., as defined by the IEEE 802.11 standards, and the like.

In one demonstrative embodiment, wireless communication unit 107 may determine or measure, e.g., periodically, the MCS, the throughput and/or the transmission power P for one or more links, for example, each link, e.g., link 121, utilized for transmission by wireless communication unit 107. Wireless communication unit 107 may set the transmission power over each of the links, e.g., link 121, to a lowest or minimal transmission power suitable for achieving the determined throughput and/or MCS of the link. Wireless communication unit 107 may, for example, set the transmission power periodically, e.g., at a predefined repetition rate. The repetition rate may include, for example a rate of at least ten beacon intervals, for example, 100 beacon intervals.

In one non-limiting example, a Signal-to-Noise-Ratio (SNR) of 10 decibel (dB) may be required for achieving a 10% Packet Error Rate (PER), e.g., for a Binary-Phase-Shift-Keying (BPSK) code rate of ½. According to this example, wireless communication unit 107 may maintain a transmission power for transmissions over link 121 at a lowest level, P<Pmax, which enables maintaining a SNR of 10 dB.

In some demonstrative embodiments, wireless communication devices of system 100, e.g., wireless communication device 104 and 106, may dynamically adjust the transmission power P. As a result, interference between transmissions of the devices of system 100 may be reduced, e.g., compared to the interference, which would result from each device of system 100 using a constant transmission power, e.g., the maximal transmission power Pmax.

In some demonstrative embodiments, a node of system 100, e.g., wireless communication device 104, may measure and/or adjust the transmission power P periodically, for example, at a predefined repetition rate or frequency, e.g. every 10 beacon intervals, every 100 beacon intervals, and the like. In one example, all nodes of system 100 may utilize the same repetition rate for measuring and/or adjusting the transmission power P.

In some demonstrative embodiments, a reduction of the transmission power utilized by a first node of system 100, e.g., wireless communication device 104, during a certain time period, e.g. 10 beacon intervals, may result in a reduction in interference to one or more neighboring nodes in system 100, for example nodes which were previously, outside a receive threshold but within a Clear Channel Avoidance (CCA) detection range. Accordingly, these neighboring nodes may also reduce the transmission power, e.g., while still achieving substantially the same data rate. As a result, the reduced transmission power utilized by the other nodes may improve the channel quality sensed by the first node. Accordingly, the first node may further reduce the transmission power, and so on, for example, until equilibrium is reached and each node of system 100 may operates at an optimum power level, e.g., after several rounds or iterations of power adjustment.

In some demonstrative embodiments, a node, e.g., wireless communication device 104, may increase the transmission power utilized by the node, e.g., from a first power level, P1, to a second power level, P2, for example, in order to achieve an increase in throughput. The node may reduce the transmission power back to the power level P1, for example, if the data rate using the power level P2 is not higher than the data rate using the power level P1.

In some demonstrative embodiments, a transmitting node, e.g., wireless communication unit 107 of device 104, may transmit a suitable MCS request to a receiving node, e.g., device 106, over a link, e.g., link 121; and determine the MCS of the link based a response MCS received from the receiving node.

In some demonstrative embodiments, the dynamic adjustment of the transmission power may be most effective, for example, if utilized by most nodes or substantially all nodes ("non-legacy nodes") of a wireless communication system, e.g., system 100. As a number of nodes ("legacy nodes"), which do not utilize the dynamic adjustment of the transmission power, increases, the efficiency of the dynamic adjustment of the transmission power may be reduced. For example, a reduced improvement or even no improvement may be achieved, if a number of the legacy nodes in a system e.g. system 100, is equal to or greater than a number of the non-legacy nodes, e.g., since the legacy nodes will continuously utilize the maximal transmission power Pmax.

In some demonstrative embodiments, a consumption level of a communication channel by a communication link may be based on a duration factor, e.g., duration of transmission over the link, and a space factor ("interference footprint area"), e.g., a portion of the channel occupied by the link. For example, if a duration of a transmission over a link within a channel is reduced by half, then the consumption of the channel is reduced by half, e.g., since another transmission may be performed during the remaining half. If the transmission power of the transmission is reduced such that the interference footprint is reduced by half, then the consumption is also reduced by half.

Conventional contention-based mechanisms, e.g., as defined by the IEEE 802.11 standards, are based on the duration of the transmission, while the interference footprint caused by the transmission is ignored. As a result, a node, e.g., a node according to the 802.11 standards, may be configured to always utilize the maximal transmission power Pmax or any other highest available transmission power, e.g., even if the maximal transmission power is excessive and/or not required for the transmission.

In some demonstrative embodiments, one or more nodes of system 100, e.g., wireless communication device 104, may determine at least one back-off parameter of a contention-based mechanism of system 100 based on the transmission power of the wireless transmission performed by the node. For example, a node using a lesser transmission power may be allowed to use the channel for a greater portion of time. On the contrary, a node using a greater transmission power may be allowed to use the channel for a smaller portion of time. Accordingly, the node may be "encouraged" to use a reduced transmission power, e.g., a lowest suitable transmission power, while allowing at least one other simultaneous transmission by at least one other node.

In some demonstrative embodiments, system 100 may implement a contention-based mechanism, in which a "Contention Window" (CW) scheme includes a contention period, during which nodes that want to transmit will wait, after sensing an open ("clear") channel, before actually performing a transmission. According to this contention-based mechanism, each node of system 100 may choose a time period ("the back-off period"), e.g., randomly, and wait until the channel has been idle for this time period before trying to transmit ("first transmission attempt"). The CW defines the maximum period that the node should wait, e.g., the random values are chosen to be within the CW. If the resulting first transmission attempt is unsuccessful, the length of the contention window can be repeatedly adjusted, e.g., as described below, for subsequent retries, up to a maximum size of the CW, until a retry is successful, or until a maximal number of retransmissions is reached. The CW period may be defined by a first value, denoted CWmin, which defines a minimum starting size of the CW, and a second value, denoted CWmax, which defines the maximal size of the CW.

In some demonstrative embodiments, wireless communication unit 107 may control a wireless transmission by wireless communication device 104 according to the back-off mechanism; and wireless communication unit 107 may determine at least one back-off parameter of the back-off mechanism based on the transmission power P of the wireless transmission, e.g., as described below.

In some demonstrative embodiments, wireless communication unit 107 may determine the one or more back-off parameters such that a duration of the back-off period may be based on the transmission power P of the wireless transmission, for example, such that a duration of the back-off period will increase with respect to an increase in the transmission power, e.g., as described in detail below.

In some demonstrative embodiments, the at least one back-off parameter may include a contention window parameter defining the contention window, e.g., the minimum contention window value CWmin or any other suitable CW parameter. For example, wireless communication unit 107 may determine the contention window based on the transmission power P, select a back-off period within the contention window, and wait for the back-off period prior to beginning the wireless transmission during a contention period.

In some demonstrative embodiments, wireless communication unit 107 may set the transmission power based on one or more parameters of a communication link, e.g., link 121, for transmitting the wireless transmission, e.g., as described above.

In some demonstrative embodiments, wireless communication unit 107 may adjust the size of the contention window, e.g., to increase the size of the contention window, based on a predefined function, which is monotonically decreasing with respect to the transmission power, e.g., as described below.

In some demonstrative embodiments, wireless communication unit 107 may reduce a size of a CW when reducing the transmission power used by wireless communication unit 107. For example, wireless communication unit 107 may use a first CW having a first CW size, when using a first transmission power; and wireless communication unit 107 may use a second CW having a second CW size, shorter than the first CW size, when using a second transmission power, lesser than the first transmission power. The reduced CW size may result in an increased level of channel access for wireless communication unit 107, e.g., since the back-off period may be selected from reduced range.

Accordingly, wireless communication unit 107 may select between using a reduced transmission power with increased channel access duration, and using an increased transmission power with reduced channel access duration. Accordingly, the shorter CW may provide wireless communication unit 107 with an "incentive" for lowering the interference footprint corresponding to the transmission power.

Some demonstrative embodiments are described herein with respect to adjusting a size of the contention window in order to adjust the duration of the back-off period. However, in other embodiments, the duration of the back-off period may be adjusted in any other suitable manner. In one example, the duration of the back-off period may be adjusted by adjusting a back-off counter rate at which the back-off period is counted. For example, the back-off counter rate may be increased to decrease the duration of the back-off period, e.g., in response to decreasing the transmission power P; and/or the back-off counter rate may be decreased to increase the duration of the back-off period, e.g., in response to increasing the transmission power P.

In some demonstrative embodiments, system 100 may include wireless communication devices, e.g., devices 104 and 106, communicating over a relatively short distance, e.g., WiDi devices communicating over a distance of ten feet or less. Such a short distance may not require, for example, using the maximal transmission power Pmax in order to achieve a suitable level of SNR, e.g., a SNR of 30 dB. Accordingly, wireless communication unit 107 may reduce the transmission power P and gain increased channel access opportunities, e.g., compared to the channel access opportunities gained by a legacy node utilizing the maximal transmission power. The reduced transmission power utilized by wireless communication unit 107 may enable simultaneous transmissions by one or more other devices, e.g., another WiDi device located in another room.

In some demonstrative embodiments, a first node competing for an opportunity to transmit over a channel, e.g., device 104, may be allowed to increase the contention window utilized by the first node, for example, at a rate which may be lower, e.g. compared to a second node, e.g., device 106, for example, if a first transmission power utilized by the first node is lesser than a second transmission power utilized by the second node.

In some demonstrative embodiments, wireless communication unit 107 may maintain the CW between the minimal contention window value CWmin, and the maximal contention window value CWmax.

In some demonstrative embodiments, wireless communication unit 107 may maintain a CW adjustment function, denoted $f(P)$, corresponding to the transmission power P utilized by wireless communication unit 107.

In some demonstrative embodiments, the function $f(P)$ may be monotonically decreasing with respect to the transmission power P, and the function $f(P)$ may be configured to return a value greater than one.

In some demonstrative embodiments, the function $f(P)$ may be based on a relationship between the transmission power P and the maximal transmission power Pmax, e.g., as follows:

$$f(P)=1+(P/P\text{max})^2 \qquad (1)$$

In some demonstrative embodiments, the function $f(P)$ may be based on the transmission power P indirectly, e.g., via one or more parameters, which are based on the transmission power P. For example, the function $f(P)$ may be based on a relationship between a transmission distance, denoted D(P), achieved by the transmission power P, and a maximal transmission distance, denoted Dmax, achieved by the transmission power Pmax, e.g., as follows:

$$f(P)=1+(D(P)/D\text{max})^2 \qquad (2)$$

In other embodiments, the function $f(P)$ may include any other suitable function and/or calculation. For example, the function $f(P)$ may include any suitable function resulting in a level of channel access which is monotonically decreasing with respect to the transmission power P.

In some demonstrative embodiments, two or more nodes of system 100, e.g., most or all nodes of system 100, may utilize substantially the same function $f(P)$.

In some demonstrative embodiments, wireless communication unit 107 may determine at least one required transmission power, denoted P_required, corresponding to at least one respective link with a receiving node to which wireless communication unit 107 is to transmit a transmission. The required transmission power P_required may include an estimated transmission power satisfying a QoS requirement corresponding to the link. For example, wireless communication unit 107 may estimate the required transmission power P_required corresponding to link 121, for example, based on a feedback signal quality and/or preferred MCS received from device 106, e.g., in accordance with any suitable standard or protocol.

In some demonstrative embodiments, wireless communication unit 107 may select a back-off period within the contention window, and wait for the back-off period prior to beginning the wireless transmission.

In some demonstrative embodiments, wireless communication unit 107 may adjust the transmission power and/or the collision window, e.g., upon detecting a collision.

In some demonstrative embodiments, wireless communication unit 107 may determine the transmission power P to be used for the transmission, e.g., based on the required transmission power P_required and the maximal transmission power Pmax, e.g., as follows:

$$P\_required <= P <= Pmax \quad (3)$$

In some demonstrative embodiments, wireless communication unit 107 may adjust the contention window by determining an adjusted minimal contention window value, denoted $CWmin_{adjusted}$, by adjusting a current contention window value, denoted $CWmin_{current}$ e.g., as follows:

$$CWmin_{adjusted} = CWmin_{current} * f(P) \quad (4)$$

In some demonstrative embodiments, wireless communication unit 107 may adjust the contention window by setting the contention window based on the adjusted value $CWmin_{adjusted}$, and the value CWmax, e.g., as follows:

$$CW_{adjusted} = Min(CWmin_{adjusted}, CWmax) \quad (5)$$

In some demonstrative embodiments, wireless communication unit 107 may select the back-off period, for example, by selecting, e.g., randomly or pseudo-randomly, a number between 0 and $CW_{adjusted}$.

In some demonstrative embodiments, wireless communication unit 107 may be capable of jointly setting the transmission power P together with adjusting the contention window. For example, wireless communication unit 107 may select a relatively reduced transmission power Pa, e.g., a transmission power Pa which is closer to P_required than to Pmax, which may result in a contention window size CW1, for example, in order to gain an increased level of channel access. Alternatively, wireless communication unit 107 may select a relatively increased transmission power Pb, e.g., Pb>Pa, for example, resulting in an increased contention window size CW2>CW1 and a relatively reduced level of channel access.

In some demonstrative embodiments, wireless communication unit 107 may be capable of setting the transmission power to be used for the transmission over link 121 based on the one or more parameters of communication link 121, e.g., as described above, for example, if all nodes in system 100 include non-legacy nodes. Wireless communication unit 107 may be capable of adjusting the contention window based on the transmission power, e.g., as described above, for example, if system 100 includes on or more legacy nodes. In one example, wireless communication unit 107 may have a first mode of operation, at which wireless communication unit 107 sets the transmission power to be used for the transmission over link 121 based on the one or more parameters of communication link 121 and, optionally, adjusts the contention window based on the transmission power; and a second mode of operation, at which wireless communication unit 107 adjusts the contention window based on the transmission power. For example, wireless communication unit 107 may operate at the first mode of operation, e.g., if no legacy node is detected; and switching to the second mode, e.g., upon detecting a legacy node.

Figure 2:
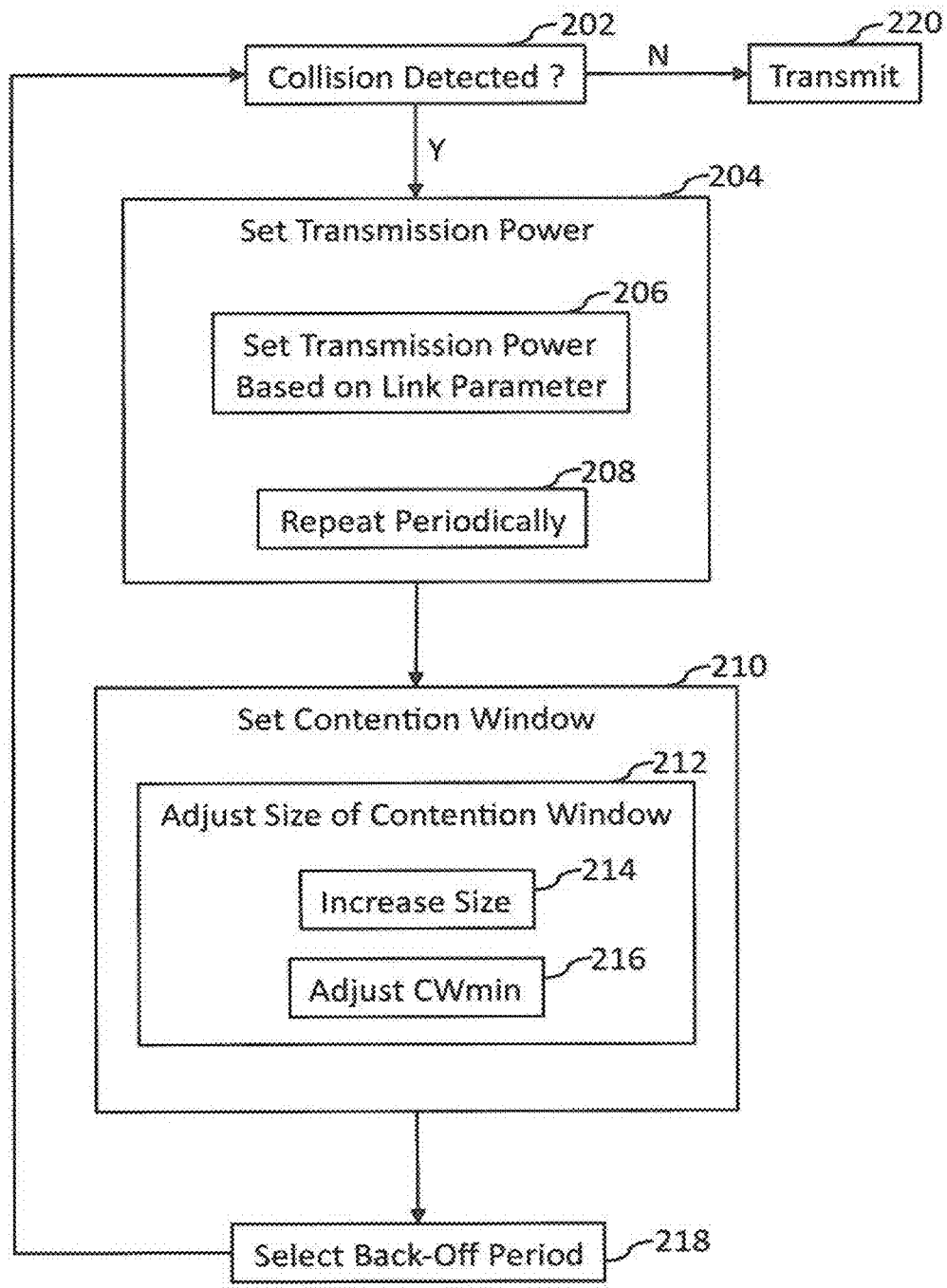
FIG. 2 is a schematic flow-chart illustration of a method of wireless communication, in accordance with some demonstrative embodiments.

Reference is made to FIG. 2, which schematically illustrates a method of wireless communication, in accordance with some demonstrative embodiments. In some demonstrative embodiments, one or more operations of the method of FIG. 2 may be performed by one or more elements of a wireless communication system, e.g., system 100 (FIG. 1), for example, a wireless communication device, e.g., devices 104 and/or 106 (FIG. 1), and/or wireless communication unit, e.g., wireless communication units 107 and/or 118 (FIG. 1).

As indicated at block 202, the method may include setting, at a wireless communication device, a transmission power of a wireless transmission.

As indicated at block 204, setting the transmission power may include setting the transmission power based on one or more parameters of a communication link for transmitting the wireless transmission according. For example, setting the transmission power may include setting the transmission power based on at least one of a data rate, a modulation-coding-scheme, a quality-of-service of the communication link, a path-loss measurement, a communication link quality, and an interference to another device, e.g., as described above with reference to FIG. 1.

As indicated at block 208, the method may include repeating the setting of the transmission power at a predefined repetition rate. For example, wireless communication unit 107 (FIG. 1) may repeatedly monitor and/or set the transmission power P, e.g., as described above.

As indicated at block 210, the method may include setting, based on the transmission power, one or more parameters of a back-off mechanism for transmitting the transmission. For example, the method may include setting a contention window of the back-off mechanism based on the transmission power.

As indicated at block 212, setting the contention window may include adjusting a size of the contention window based on the transmission power.

As indicated at block 214, adjusting the size of the contention window may include increasing the size of the contention window based on a predefined function, which is monotonically decreasing with respect to the transmission power. For example, wireless communication unit 107 (FIG. 1) may adjust the size of the contention window based on the function $f(P)$, e.g., as described above.

As indicated at block 216, adjusting the size of the contention window may include increasing a minimum contention window value based on the transmission power. For example, wireless communication unit 107 (FIG. 1) may adjust the value of CWmin based on the transmission power P, e.g., as described above.

As indicated at block 218, the method may include selecting aback-off period within the contention window. For example, wireless communication unit 107 (FIG. 1) may select the back-off period based on the contention window, and wait for the back-off period, e.g., as described above with reference to FIG. 1.

As indicated at block 202, the method may include determining whether a collision is detected. For example, wireless communication unit 107 (FIG. 1) may determine whether a collision is detected prior to transmitting the transmission over the link.

As indicated at block 220, the method may include transmitting the transmission, for example, after the back-off period has expired, e.g., and a collision has not been detected.

Figure 3:
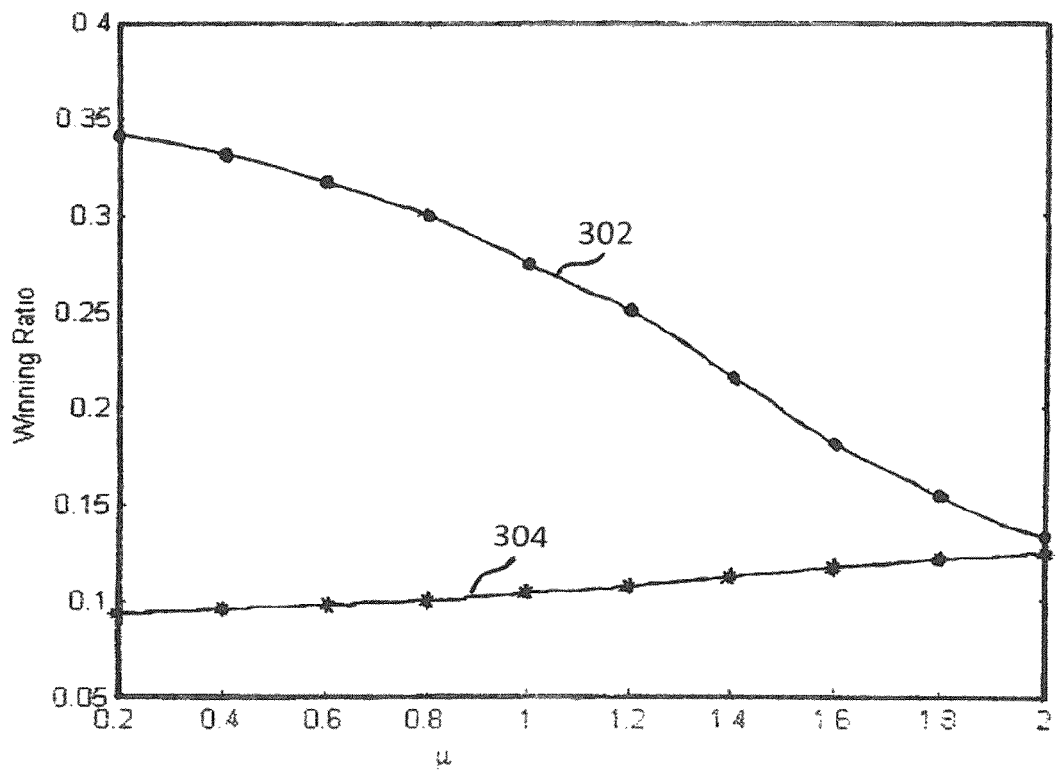
FIG. 3 is a schematic illustration of a first graph depicting a winning ratio as a function of a window adjustment factor in a wireless area network, for a wireless communication device utilizing the window adjustment factor, and a second graph depicting the winning ratio for one or more other wireless communication devices, in accordance with some demonstrative embodiments.

Reference is made to FIG. 3, which schematically illustrates a first graph 302 depicting a winning ratio as a function of a window adjustment factor, denoted μ, in a wireless area network, for a wireless communication device utilizing the window adjustment factor, and a second graph 304 depicting the winning ratio for one or more other wireless communication devices, in accordance with some demonstrative embodiments. In other embodiments, any other suitable results may be obtained.

Curve 302 depicts the winning ratio for the wireless communication device when the wireless communication device adjusts the size of the contention window by the adjustment factor μ upon detection of a collision; while curve 304 depicts the winning ratio for seven other wireless communication devices, which adjust the size of the contention window by a constant factor of 2 upon detection of a collision, e.g., according to the IEEE 802.11 standards. As shown in FIG. 3, an increase in the winning ratio of the wireless communication device may be achieved by using a variable adjustment factor.

In one demonstrative embodiment, a simulation deployment may include 400 nodes distributed according to a 20×20 grid set up. This simulation deployment may result in a level of channel utilization per node of 0.1005, e.g., at a first power utilization mode, in which each node is configured to constantly utilize the maximal transmission power Pmax. This simulation deployment may result in an increased level of channel utilization per node of 0.3126, e.g., at a second power utilization mode, in which each node is configured to adjust the contention window based on the transmission power, e.g., as described above. This simulation deployment may result in a further increased level of channel utilization per node of 0.4819, e.g., at a third power utilization mode, in which each node is configured to utilize the minimal allowable transmission power, e.g., as described above. Accordingly, an increase in throughput by a factor of about three may be achieved by using the second power utilization mode, e.g., compared to the throughput achieved by the first power utilization mode. An increase in throughput by a factor of about five may be achieved by using the third power utilization mode, e.g., compared to the throughput achieved by the first power utilization mode.

Figure 4:
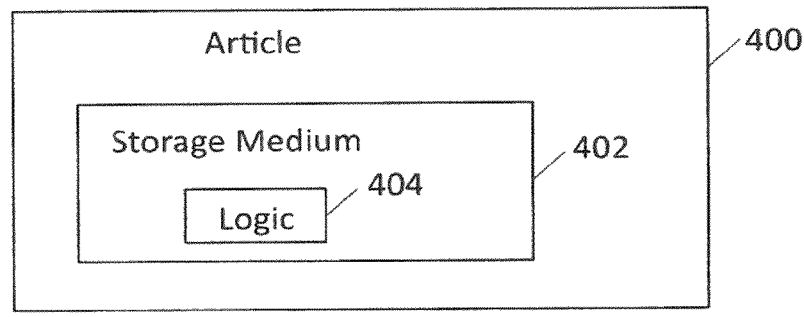
FIG. 4 is a schematic illustration of an article of manufacture, in accordance with some demonstrative embodiments.

Reference is made to FIG. 4, which schematically illustrates an article of manufacture 400, in accordance with some demonstrative embodiments. Article 400 may include a machine-readable storage medium 402 to store logic 404, which may be used, for example, to perform at least part of the functionality of wireless communication unit 107 (FIG. 1) and/or wireless communication unit 118 (FIG. 1), and/or to perform one or more operations of the method of FIG. 2.

In some embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
a wireless communication unit to control a wireless transmission by the wireless communication device during a contention period,
wherein the wireless communication unit is to wait for a back-off period prior to beginning the wireless transmission during the contention period,
wherein a duration of the back-off period is based on a contention-window adjustment function corresponding to a transmission power of the wireless transmission, wherein the wireless communication unit is to determine said duration of said back-off period based on a relationship between said transmission power and a maximal transmission power, and to increase the duration of the back-off period with respect to an increase in the transmission power.

2. The wireless communication device of claim 1, wherein the contention-window adjustment function is based on a relationship between the transmission power and the maximal transmission power as follows: $f(P)=1+(P/P_{max})^2$, wherein $f(P)$ denotes the contention-window adjustment function, wherein P denotes the transmission power, and wherein Pmax denotes the maximal transmission power.

3. The wireless communication device of claim 1, wherein the contention-window adjustment function is based on a relationship between a transmission distance, denoted $D(P)$, achieved by the transmission power, denoted P, and a maximal transmission distance, denoted Dmax, as follows: $f(P)=1+(D(P)/D_{max})^2$.

4. The wireless communication device of claim 1, wherein the wireless communication unit is to set the transmission power based on one or more parameters of a communication link for transmitting the wireless transmission.

5. The wireless communication device of claim 4, wherein the wireless communication unit is to repeat the setting of the transmission power at a predefined repetition rate.

6. The wireless communication device of claim 4, wherein the wireless communication unit is to set the transmission power based on at least one parameter selected from the group consisting of a data rate, a modulation-coding-scheme, a quality-of-service of the communication link, a path-loss measurement, a communication link quality, and an interference to another device.

7. A wireless communication device comprising:
a wireless communication unit to control a wireless transmission by the wireless communication device during a contention period,
wherein the wireless communication unit is to wait for a back-off period prior to beginning the wireless transmission during the contention period, a duration of the back-off period is based on a contention-window adjustment function corresponding to a transmission power of the wireless transmission,
wherein the wireless communication unit is to determine the size of a contention window based on the contention-window adjustment function and to select the back-off period within the contention window, and wherein the contention-window adjustment function is monotonically decreasing with respect to the transmission power.

8. The wireless communication device of claim 7, wherein the wireless communication unit is to set the transmission power based on one or more parameters of a communication link for transmitting the wireless transmission.

9. A wireless communication system including:
a wireless communication device including:
at least one antenna; and
a wireless communication unit to control a wireless transmission via the antenna according to a back-off mechanism utilizing a back-off period,
wherein the wireless communication unit is to determine at least one back-off parameter of the back-off mechanism based on a transmission power of the wireless transmission, wherein said wireless communication unit is to determine a duration of said back-off period based on a relationship between said transmission power and a maximal transmission power, and to increase the duration of the back-off period with respect to an increase in said transmission power.

10. The wireless communication system of claim 9, wherein the at least one back-off parameter includes a contention window parameter defining a contention window.

11. A wireless communication system including:
a wireless communication device including:
at least one antenna; and
a wireless communication unit to control a wireless transmission via the antenna according to a back-off mechanism utilizing a back-off period,
wherein the wireless communication unit is to determine at least one back-off parameter of the back-off mechanism based on a transmission power of the wireless transmission, wherein the at least one back-off parameter includes a contention window parameter defining a contention window, wherein the contention window parameter includes a minimum contention window value, and wherein said wireless communication unit is to increase the duration of the back-off period with respect to an increase in said transmission power.

12. The wireless communication system of claim 11, wherein said wireless communication unit is to set the transmission power based on one or more parameters of a communication link for transmitting the wireless transmission.

13. The wireless communication system of claim 9, wherein the wireless communication unit is to determine said duration of said back-off period based on a relationship between a transmission distance achieved by the transmission power and a maximal transmission distance.

14. The wireless communication system of claim 9, wherein the wireless communication unit is to set the transmission power based on one or more parameters of a communication link for transmitting the wireless transmission.

15. The wireless communication system of claim 14, wherein the wireless communication unit is to repeat the setting of the transmission power at a predefined repetition rate.

16. The wireless communication system of claim 14, wherein the wireless communication unit is to set the transmission power based on at least one parameter selected from the group consisting of a data rate, a modulation-coding-scheme, a quality-of-service of the communication link, a path-loss measurement, a communication link quality, and an interference to another device.

17. A method including:
at a wireless communication device, setting a transmission power of a wireless transmission based on one or more parameters of a communication link for transmitting the wireless transmission according to a back-off mechanism utilizing a back-off period; and
based on the transmission power, adjusting a duration of the back-off period, wherein adjusting the duration of the back-off period includes determining said duration of said back-off period based on a relationship between said transmission power and a maximal transmission power, and wherein adjusting the duration of the back-off period includes increasing the duration of the back-off period with respect to an increase in the transmission power.

18. The method of claim 17, wherein setting the transmission power includes setting the transmission power based on at least one parameter selected from the group consisting of a data rate, a modulation-coding-scheme, a quality-of-service of the communication link, a path-loss measurement, a communication link quality, and an interference to another device.

19. A method including:
at a wireless communication device, setting a transmission power of a wireless transmission based on one or more parameters of a communication link for transmitting the wireless transmission according to a back-off mechanism utilizing a back-off period; and
based on the transmission power, adjusting a duration of the back-off period, wherein adjusting the duration of the back-off period includes increasing the duration of the back-off period with respect to an increase in the transmission power, and wherein adjusting the duration of the back-off period includes adjusting a size of a contention window based on a predefined function, which is monotonically decreasing with respect to the transmission power, and selecting the back-off period within the contention window.

20. The method of claim 19, comprising repeating the setting of the transmission power at a predefined repetition rate.

* * * * *